United States Patent
Zhou et al.

(10) Patent No.: US 11,537,696 B2
(45) Date of Patent: Dec. 27, 2022

(54) METHOD AND APPARATUS FOR TURNING ON SCREEN, MOBILE TERMINAL AND STORAGE MEDIUM

(71) Applicant: GUANGDONG OPPO MOBILE TELECOMMUNICATIONS CORP., LTD., Guangdong (CN)

(72) Inventors: Haitao Zhou, Dongguan (CN); Fangfang Hui, Dongguan (CN); Ziqing Guo, Dongguan (CN); Xiao Tan, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 823 days.

(21) Appl. No.: 16/477,439

(22) PCT Filed: Feb. 18, 2019

(86) PCT No.: PCT/CN2019/075383
§ 371 (c)(1),
(2) Date: Jul. 11, 2019

(87) PCT Pub. No.: WO2019/196558
PCT Pub. Date: Oct. 17, 2019

(65) Prior Publication Data
US 2020/0380100 A1     Dec. 3, 2020

(30) Foreign Application Priority Data
Apr. 12, 2018 (CN) .......................... 201810327835.6

(51) Int. Cl.
G06F 21/32     (2013.01)
G06T 7/55     (2017.01)
(Continued)

(52) U.S. Cl.
CPC .............. *G06F 21/32* (2013.01); *G06F 21/84* (2013.01); *G06T 7/521* (2017.01); *G06T 7/55* (2017.01);
(Continued)

(58) Field of Classification Search
USPC ........ 713/186, 150, 163, 181; 726/2, 21, 36; 380/255, 264, 276
See application file for complete search history.

(56) References Cited

U.S. PATENT DOCUMENTS 8,381,969 B1 * 2/2013 Miller ................. G06Q 20/382
235/375
9,369,870 B2 * 6/2016 Varadarajan .......... H04W 12/08
(Continued)

FOREIGN PATENT DOCUMENTS

CN     101339607 A     1/2009
CN     101893934 A     11/2010
(Continued)

OTHER PUBLICATIONS

Notice of Allowance of the Chinese application No. 201810327835.6, dated Aug. 30, 2019.
(Continued)

*Primary Examiner* — Sharif E Ullah
(74) *Attorney, Agent, or Firm* — Ladas & Parry, LLP

(57) ABSTRACT

Provided are a method and apparatus for turning on a screen, a mobile terminal and a storage medium. The method comprises that: when a change in a moving state of a mobile terminal meets a preset unlocking condition, a structured light image sensor is activated for imaging; a depth map obtained by the imaging of the structured light image sensor is acquired; a face depth model is constructed according to the depth map; a position of pupils is identified from the face depth model; and when the position of the pupils is within
(Continued)

a specified region of eyes, the screen of the mobile terminal is controlled to turn on.

16 Claims, 5 Drawing Sheets

(51) Int. Cl.
*G06T 7/521* (2017.01)
*G06F 21/84* (2013.01)
*G06V 40/16* (2022.01)
*G06V 40/18* (2022.01)

(52) U.S. Cl.
CPC .......... *G06V 40/165* (2022.01); *G06V 40/197* (2022.01); *G06T 2207/30201* (2013.01)

(56) References Cited

U.S. PATENT DOCUMENTS

| | | | | |
|---|---|---|---|---|
| 11,113,510 | B1* | 9/2021 | Mostafa | G06F 21/32 |
| 2006/0059557 | A1* | 3/2006 | Markham | G08B 29/188 |
| | | | | 726/22 |
| 2006/0213982 | A1* | 9/2006 | Cannon | G06K 7/006 |
| | | | | 235/380 |
| 2007/0061590 | A1* | 3/2007 | Boye | G06F 21/305 |
| | | | | 713/186 |
| 2008/0018451 | A1* | 1/2008 | Slibeck | G07C 9/257 |
| | | | | 340/552 |
| 2008/0162943 | A1* | 7/2008 | Ali | H04L 9/3234 |
| | | | | 713/185 |
| 2008/0178008 | A1* | 7/2008 | Takahashi | G07C 9/257 |
| | | | | 713/186 |
| 2009/0183008 | A1* | 7/2009 | Jobmann | G06F 21/34 |
| | | | | 235/382 |
| 2010/0275258 | A1* | 10/2010 | Kamakura | G06K 9/6277 |
| | | | | 726/19 |
| 2011/0246817 | A1* | 10/2011 | Orsini | G06F 21/60 |
| | | | | 714/E11.062 |
| 2012/0331557 | A1* | 12/2012 | Washington | G06Q 20/4016 |
| | | | | 726/26 |
| 2014/0155031 | A1* | 6/2014 | Lee | H04W 4/80 |
| | | | | 455/411 |
| 2017/0039994 | A1* | 2/2017 | Wu | G09G 5/10 |
| 2017/0091437 | A1 | 3/2017 | Lee et al. | |
| 2017/0337706 | A1* | 11/2017 | Marsh | G06V 10/147 |
| 2017/0344793 | A1* | 11/2017 | Xue | G06V 10/44 |
| 2017/0351905 | A1* | 12/2017 | Wang | G06V 40/171 |
| 2018/0007060 | A1* | 1/2018 | Leblang | H04L 63/20 |
| 2018/0081430 | A1* | 3/2018 | Konz | G06F 3/015 |
| 2019/0036939 | A1* | 1/2019 | Johansson | G06F 21/6245 |
| 2019/0050866 | A1* | 2/2019 | Wang | G06Q 20/40145 |
| 2019/0239078 | A1 | 8/2019 | Lee et al. | |
| 2020/0250403 | A1* | 8/2020 | Xiao | G06V 10/761 |
| 2020/0257893 | A1* | 8/2020 | Trani | G06V 40/172 |

FOREIGN PATENT DOCUMENTS

| | | | |
|---|---|---|---|
| CN | 102572269 | A | 7/2012 |
| CN | 103064520 | A | 4/2013 |
| CN | 103902043 | A | 7/2014 |
| CN | 103971408 | A | 8/2014 |
| CN | 104133548 | A | 11/2014 |
| CN | 104238948 | A | 12/2014 |
| CN | 104376599 | A | 2/2015 |
| CN | 104662600 | A | 5/2015 |
| CN | 104749945 | A | 7/2015 |
| CN | 105224065 | A | 1/2016 |
| CN | 106250851 | A | 12/2016 |
| CN | 106774796 | A | 5/2017 |
| CN | 206431724 | U | 8/2017 |
| CN | 107368725 | A | 11/2017 |
| CN | 107504621 | A | 12/2017 |
| CN | 107577930 | A | 1/2018 |
| CN | 107621867 | A | 1/2018 |
| CN | 107748869 | A | 3/2018 |
| CN | 107832669 | A | 3/2018 |
| CN | 107885352 | A | 4/2018 |
| CN | 108628448 | A | 10/2018 |
| EP | 2738706 | A1 | 6/2014 |

OTHER PUBLICATIONS

Notice of Allowance of the Chinese application No. 201911025279. 8, dated Sep. 1, 2021.
First Office Action of the Indian application No. 201917032314, dated Feb. 2, 2021.
First Office Action of the Taiwanese application No. 108112613, dated Jan. 7, 2020.
Keyurkumar Patel et al: "Secure Face Unlock: Spoof Detection on Smartphones", IEEE Transactions on Information Forensics and Security, vol. 11, No. 10, Jun. 8, 2016 (Jun. 8, 2016), pp. 2268-2283, XP055365152, US ISSN: 1556-6013, DOI: 10.1109/TIFS.2016. 2578288 * abstract *.
Supplementary European Search Report in the European application No. 19734656.2, dated Dec. 4, 2019.
Second Office Action of CN application No. 201810327835.6, dated Apr. 23, 2019 and English translation provided by Google translate.
Third Office Action of CN application No. 201810327835.6, dated Jun. 24, 2019.
International Search Report in the international application No. PCT/CN2019/075383, dated May 29, 2019 and English translation provided by Google translate.
Written Opinion of the International Search Authority in the international application No. PCT/CN2019/075383, dated May 29, 2019 and English translation provided by Google translate.
First Office Action and search report of CN application No. 201810327835.6, dated Feb. 19, 2019.

* cited by examiner

METHOD AND APPARATUS FOR TURNING ON SCREEN, MOBILE TERMINAL AND STORAGE MEDIUM

CROSS-REFERENCE TO RELATED APPLICATIONS

The present application is the U.S. national phase of PCT Application No. PCT/CN2019/075383 filed on Feb. 19, 2019, which disclosure claims priority and benefit to Chinese Patent Application No. 201810327835.6 filed on Apr. 12, 2018, the contents of which are hereby incorporated by reference in their entireties.

TECHNICAL FIELD

The disclosure relates to the technical field of mobile terminals, and in particular to a method and an apparatus for turning on a screen, a mobile terminal and a storage medium.

BACKGROUND

Along with the development of electronic technology, face unlocking has been gradually applied to a mobile terminal. In the face unlocking technology applied to the mobile terminal, it is a common practice that when the mobile terminal is uplifted by a user, the mobile terminal detects a face; and when the face is detected, the mobile terminal turns on a screen automatically to unlock.

SUMMARY

The embodiments of the disclosure provide a method and an apparatus for turning on a screen, a mobile terminal and a storage medium. By identifying a position of pupils in a constructed face depth model, when the position of the pupils is within a specified region of eyes, the screen of the mobile terminal is controlled to turn on a screen; enabling only when the eyes are focused on the screen of the mobile terminal, the screen of the mobile terminal can be controlled to turn on the screen to unlock the mobile terminal, so that a false unlocking of the mobile terminal is effectively prevented and thus the user experience is improved.

According to a first aspect of the disclosure, an embodiment provides a method for turning on a screen, which may include the following operations.

When it is detected that a change in a moving state of a mobile terminal meets a preset unlocking condition, a structured light image sensor is activated for imaging.

A depth image obtained by the imaging of the structured light image sensor is acquired.

A face depth model is constructed according to the depth map.

A position of pupils is identified from the face depth model.

When the position of the pupils is within a specified region of eyes, the screen of the mobile terminal is controlled to turn on.

According to a second aspect of the disclosure, an embodiment provides an apparatus for turning on a screen, which may include a first activation module, an acquisition module, a construction module, an identification module and a second control module.

The first activation module is configured to activate, when a change in a moving state of a mobile terminal meets a preset unlocking condition, a structured light image sensor for imaging.

The acquisition module is configured to acquire a depth map obtained by the imaging of the structured light image sensor.

The construction module is configured to construct a face depth model according to the depth map.

The identification module is configured to identify a position of pupils from the face depth model.

The second control module is configured to control, when the position of the pupils is within a specified region of eyes, the screen of the mobile terminal to turn on.

According to a third aspect of the disclosure, an embodiment provides a mobile terminal, which may include an imaging sensor, a memory, a Microcontroller Unit (MCU), a processor, and a trusted application stored on the memory and capable of running under a Trusted Execution Environment (TEE) of the processor.

The MCU is a dedicated hardware of the TEE and connected with the imaging sensor and the processor, and the MCU is configured to activate the imaging sensor to image and send imaging data to the processor.

The processor executes the trusted application to implement the following operations of turning on a screen: when a change in a moving state of a mobile terminal meets a preset unlocking condition, a structured light image sensor is activated for imaging; a depth map obtained by the imaging of the structured light image sensor is acquired; a face depth model is constructed according to the depth map; a position of pupils is identified from the face depth model; and when the position of the pupils is within a specified region of eyes, the screen of the mobile terminal is controlled to turn on.

According to a fourth aspect of the disclosure, an embodiment provides a computer readable storage medium having a computer program stored thereon; and the computer program, when being executed by the processor, implements the method for turning on a screen according to the embodiment of the first aspect.

Some additional aspects and advantages of the disclosure will be set forth in part in the following description, which follows and in part will become apparent from the following description or will be learned by practice of the disclosure.

BRIEF DESCRIPTION OF DRAWINGS

The above and/or additional aspects and advantages of the disclosure will become apparent and will be easily understood from the following description of the embodiments with reference to the accompanying drawings. In the drawings.

DETAILED DESCRIPTION

Figure 1:
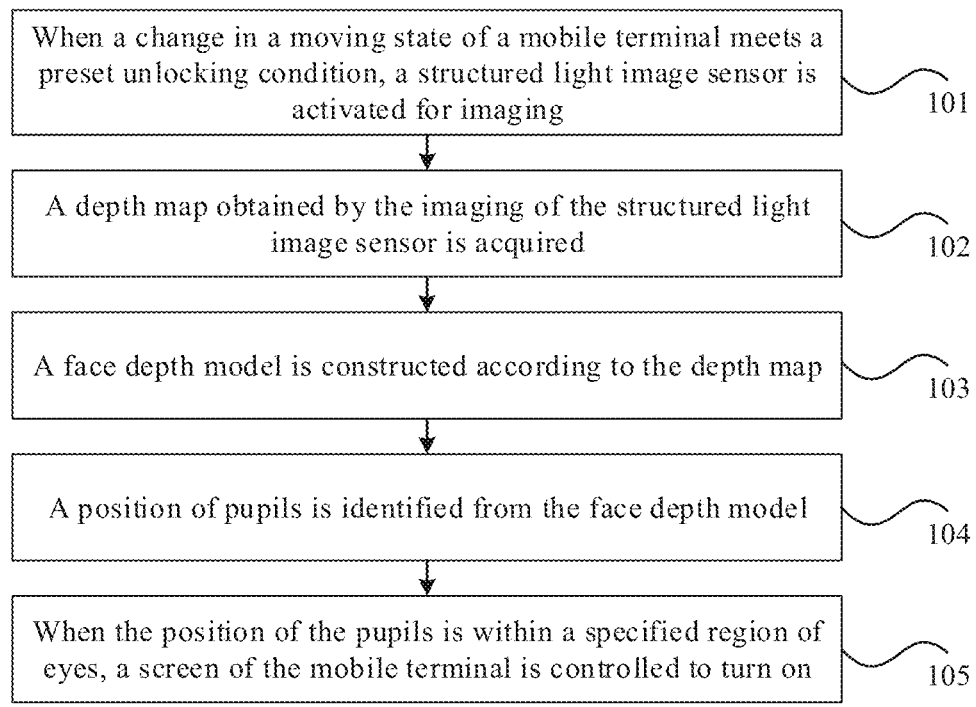
FIG. 1 illustrates a flowchart schematic diagram of a method for turning on a screen according to a first embodiment of the disclosure.

The embodiments of the disclosure will be described below in detail with reference to the drawings. Same or similar numerals in the drawings indicate same or similar elements or elements having same or similar functions throughout. Furthermore, the embodiments described below with reference to the accompanying drawings are exemplary, merely intended to explain the embodiments of the disclosure and should not be taken to limit to the disclosure.

A method and an apparatus for turning on a screen, a mobile terminal and a storage medium according to the embodiments of the disclosure will be described below with reference to the accompanying drawings.

Figure 9:
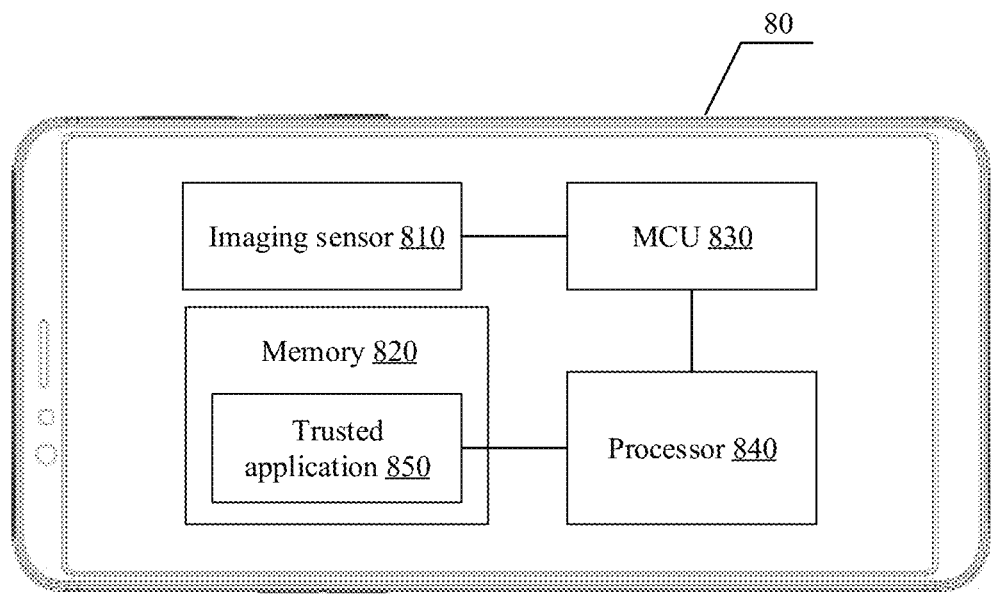
FIG. 9 illustrates a structural schematic diagram of a mobile terminal according to an embodiment of the disclosure.

Referring to FIG. 1 and FIG. 9, a method for turning on a screen according to an embodiment of the disclosure may include the following operations.

At 101, when a change in a moving state of a mobile terminal 80 meets a preset unlocking condition, a structured light image sensor is activated for imaging.

At 102, a depth map obtained by the imaging of the structured light image sensor is acquired.

At 103, a face depth model is constructed according to the depth map.

At 104, a position of pupils is identified from the face depth model.

At 105, when the position of the pupils is within a specified region of eyes, the screen of the mobile terminal 80 is controlled to turn on.

Figure 4:
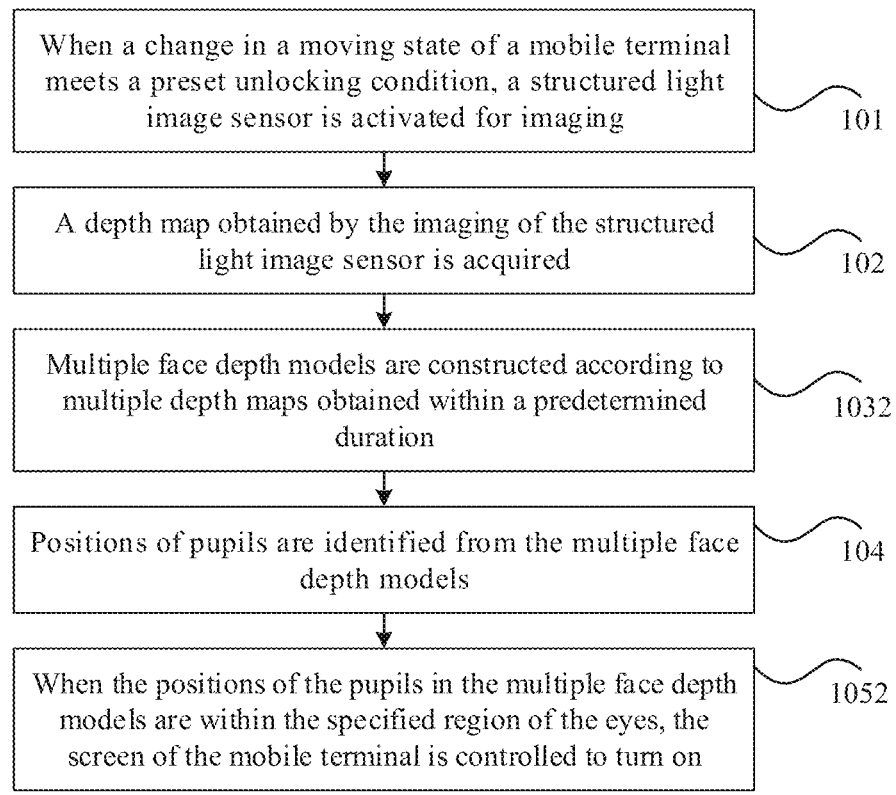
FIG. 4 illustrates a flowchart schematic diagram of a method for turning on a screen according to a fourth embodiment of the disclosure.

Referring to FIG. 4 and FIG. 9, in some embodiments, the operation in 103 may include the following operation.

At 1032, multiple face depth models are constructed according to multiple depth maps obtained within a predetermined duration.

The operation in 105 may include the following operation.

At 1052, when positions of the pupils in each of the multiple face depth models are within the specified region of the eyes, the mobile terminal 80 is activated to turn on the screen.

Figure 2:
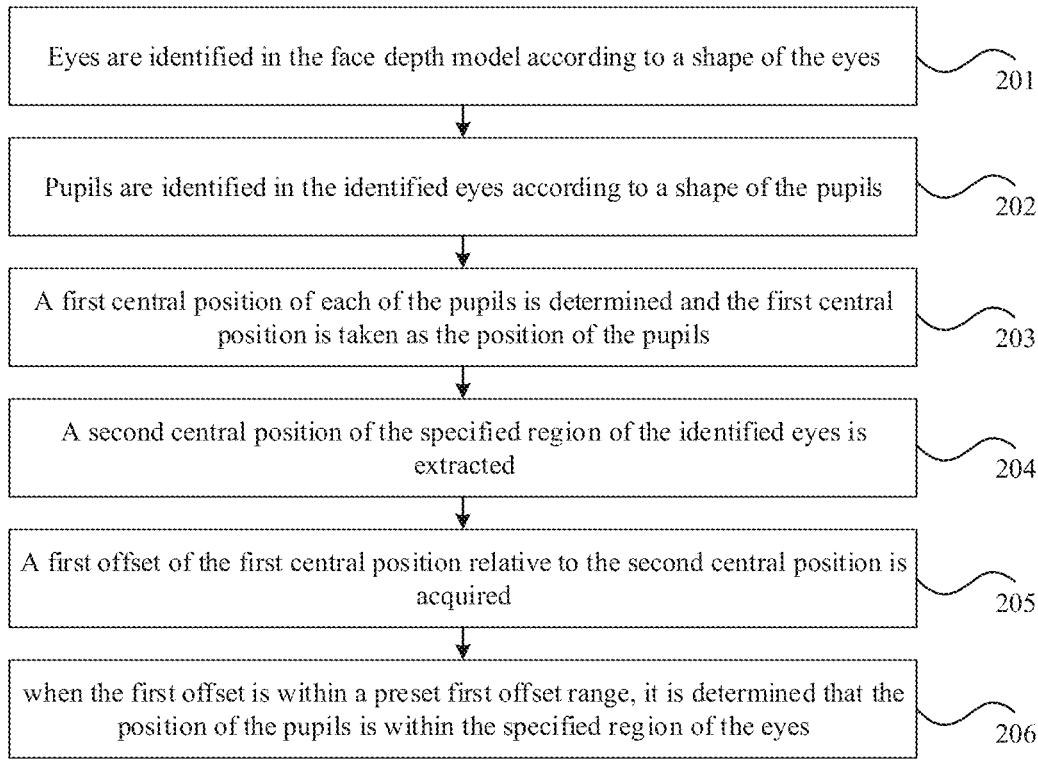
FIG. 2 illustrates a flowchart schematic diagram of a method for turning on a screen according to a second embodiment of the disclosure.

Referring to FIG. 2, in some embodiments, the operation in 105 may include the following operations.

At 201, the eyes are identified from the face depth model according to a shape of the eyes.

At 202, the pupils are identified in the eyes according to a shape of the pupils. At 203, a first central position of the pupils is determined, and the first central position is taken as the position of the pupils.

Referring to FIG. 2, in some embodiments, the operation in 105 may further include the following operations.

At 204, a second central position of the specified region of the eyes is extracted.

At 205, a first offset of the first central position relative to each second central position is acquired.

At 206, when the first offset is within a preset first offset range, it is determined that the position of the pupils is within the specified region of the eyes.

Figure 3:
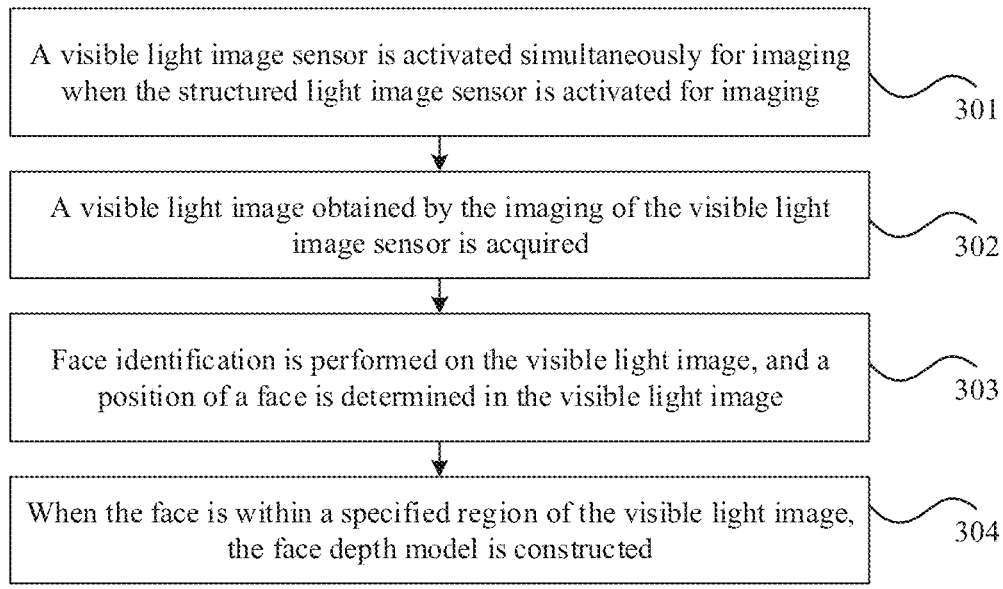
FIG. 3 illustrates a flowchart schematic diagram of a method for turning on a screen according to a third embodiment of the disclosure.

Referring to FIG. 3, in some embodiments, before the operation in 104, the method may further include the following operations.

At 301, a visible light image sensor is activated for imaging simultaneously when the structured light image sensor is activated for imaging;

At 302, a visible light image obtained by the imaging of the visible light image sensor is acquired.

At 303, face identification is performed on the visible light image, and a position of a face in the visible light image is determined.

At 304, when the face is within a specified region of the visible light image, a face depth model is constructed.

In some embodiments, after the operation in 303, the method may further include the following operations.

A third central position of the face is determined.

A fourth central position is extracted in the specified region of the visible light image.

A second offset of the third central position relative to the fourth central position is acquired.

When the second offset is within a preset second offset range, it is determined that the face is within the specified region of the visible light image.

In some embodiments, before the structured light image sensor is activated for imaging, the method may further include the following operations.

An infrared sensor is activated for imaging.

An infrared image obtained by the imaging of the infrared sensor is acquired. A face profile is extracted from the infrared image.

When the face profile is matched with a pre-stored face profile, it is determined that a present imaging object is an owner of the mobile terminal.

In some embodiments, the method for turning on a screen is executed by a trusted application 850, and the trusted application 850 runs in a TEE.

In some embodiments, a dedicated hardware of the TEE communicates with the trusted application 850.

Figure 6:
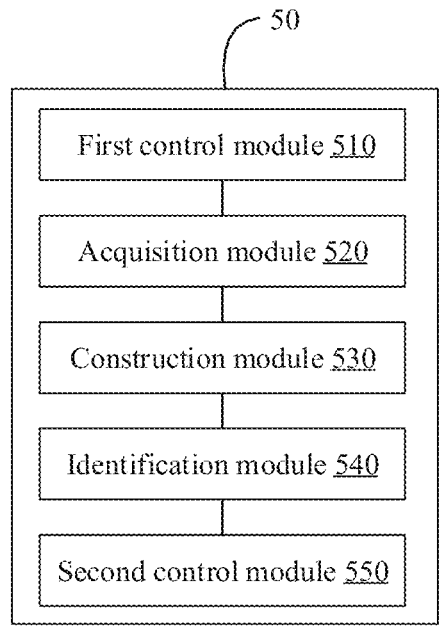
FIG. 6 illustrates a structural schematic diagram of an apparatus for turning on a screen according to a first embodiment of the disclosure.

Referring to FIG. 6 and FIG. 9, an apparatus for turning on a screen 50 according to the disclosure may include a first control module 510, an acquisition module 520, a construction module 530, an identification module 540 and a second control module 550. The first control module 510 is configured to activate, when a change in a moving state of a mobile terminal 80 meets a preset unlocking condition, a structured light image sensor for imaging. The acquisition module 520 is configured to acquire a depth map obtained by the imaging of the structured light image sensor. The construction module 530 is configured to construct a face depth model according to the depth map. The identification module 540 is configured to identify a position of pupils from the face depth model. The second control module 550 is configured to control, when the position of the pupils is within a specified region of eyes, the screen of the mobile terminal 80 to turn on.

Referring to FIG. 1 and FIG. 9, the mobile terminal 80 in an embodiment of the disclosure may include: an imaging sensor 810, a memory 820, an MCU 830, a processor 840, and a trusted application 850 stored on the memory 820 and capable of running under a TEE of the processor 840.

The MCU 830 is a dedicated hardware of the TEE, connected with the imaging sensor 810 and the processor 840, and is configured to activate the imaging sensor 810 to image and send imaging data to the processor 840.

The processor 840 executes the trusted application 850 to implement the following operations of turning on a screen.

At 101: when a change in a moving state of a mobile terminal 80 meets a preset unlocking condition, a structured light image sensor is activated for imaging.

At 102, a depth map obtained by the imaging of the structured light image sensor is acquired.

At 103, a face depth model is constructed according to the depth map.

At 104, a position of pupils is identified from the face depth model.

At 105, when the position of the pupils is within a specified region of eyes, the screen of the mobile terminal 80 is controlled to turn on.

Referring to FIG. 4 and FIG. 9, in some embodiments, the processor 840 executes the trusted application 850 to implement the following operations.

At 1032, multiple face depth models are constructed according to multiple depth maps obtained within a predetermined duration.

At 1052, when positions of the pupils in each of the multiple face depth models are within the specified region of the eyes, the screen of the mobile terminal 80 is controlled to turn on.

Referring to FIG. 2 and FIG. 9, in some embodiments, the processor 840 executes the trusted application 850 to implement the following operations.

At 201, the eyes are identified from the face depth model according to a shape of eyes.

At 202, the pupils are identified in the eyes according to a shape of the pupils. At 203, a first central position of the pupils is determined and the first central position is taken as the position of the pupils.

Referring to FIG. 2 and FIG. 9, in some embodiments, the processor 840 executes the trusted application 850 to implement the following operations.

At 204, a second central position of the specified region of the eyes is extracted.

At 205, a first offset of the first central position relative to the second central position is acquired.

At 206, when the first offset is within a preset first offset range, it is determined that the position of the pupils is within the specified region of the eyes. Referring to FIG. 3 and FIG. 9, in some embodiments, the processor 840 executes the trusted application 850 to implement the following operations.

At 301, when the structured light image sensor is activated for imaging, a visible light image sensor is simultaneously activated for imaging;

At 302, a visible light image obtained by the imaging of the visible light image sensor is acquired.

At 303, face identification is performed on the visible light image, and a position of a face in the visible light image is determined.

At 304, when the face is within a specified region of the visible light image, a face depth model is triggered to construct.

Referring to FIG. 9, in some embodiments, the processor 840 executes the trusted application 850 to implement the following operations.

A third central position of the face is determined.

A fourth central position of the specified region of the visible light image is extracted.

A second offset of the third central position relative to the fourth central position is acquired.

When the second offset is within a preset second offset range, it is determined that the face is within the specified region of the visible light image.

Referring to FIG. 9, in some embodiments, the processor 840 executes the trusted application 850 to implement the following operations.

An infrared sensor is activated for imaging.

An infrared image obtained by the imaging of the infrared sensor is acquired.

A face profile is extracted from the infrared image.

When the face profile is matched with a pre-stored face profile, it is determined that a present imaging object is an owner of the mobile terminal.

Referring to FIG. 9, in some embodiments, the trusted application 850 runs in a TEE.

Referring to FIG. 9, in some embodiments, a dedicated hardware of the TEE communicates with the trusted application 850.

Referring to FIG. 9, in some embodiments, the MCU 830 communicates with the processor 840 in an encryption manner.

An embodiment of the disclosure provides a computer readable storage medium having a computer program stored thereon; and the computer program, when being executed by a processor, implements the method for turning on a screen according to any in any one of the abovementioned embodiments.

In the existing face unlocking technology of the mobile terminal, when the mobile terminal detects that the mobile terminal is uplifted by a user, the face identification is performed by the mobile terminal; and if the face is detected, the mobile terminal automatically turns on or wakes up the screen to unlock the mobile terminal. However, the above unlocking method fails to consider whether the user has an intention of using the mobile terminal at present, and in condition that the user does not have such an intention, an image of the face may be captured so as to cause the false unlocking of the screen of the mobile terminal. For example, in condition that the user picks up the mobile terminal and moves it from one position to another position, if the face of the user faces towards the screen of the mobile terminal at a very short moment, at this time, the mobile terminal detects the face and automatically turns on the screen to unlock. In this way, the user is only intended to move the mobile terminal and does not need to use the mobile terminal, and thus it is not expected by the user to enable the mobile terminal to turn on the screen to unlock, i.e., a false operation is occurred; and as a result, the user experience is affected.

For the above problem, an embodiment of the disclosure provides a method for turning on a screen; and only when eyes are focused on a screen of a mobile terminal, the screen of the mobile terminal can be controlled to turn on to unlock the mobile terminal, so that a false unlocking of the mobile terminal is effectively prevented and thus the user experience is improved.

FIG. 1 illustrates a flowchart schematic diagram of a method for turning on a screen according to a first embodiment of the disclosure. The method may be implemented by a mobile terminal.

As illustrated in FIG. 1, the method for turning on a screen may include the following operations.

At 101, when a change in a moving state of a mobile terminal meets a preset unlocking condition, a structured light image sensor is activated for imaging.

In this embodiment, a gyroscope, a gravity sensor and the like may be mounted in the mobile terminal to detect a moving state of the mobile terminal. When the change in the moving state of the mobile terminal meets the preset unlocking condition, the structured light image sensor is activated for imaging. The preset unlocking condition may be stored in a local memory of the mobile terminal.

Example 1: the unlocking condition may be that a duration of the mobile terminal in the moving state reaches a preset threshold. In this example, when it is detected by the gyroscope, gravity sensor and the like mounted in the mobile terminal that the mobile terminal starts to move, a timer in the mobile terminal is activated to start the time so as to obtain the duration of the mobile terminal in the moving state; the duration of the mobile terminal in the moving state is compared with the preset threshold; and when the duration reaches the preset threshold, the structured light image sensor is controlled to start for imaging.

Example 2: the unlocking condition may be that the face is identified by the mobile terminal during its movement from the moving state to a stop state. In this example, when it is detected by the gyroscope, gravity sensor and the like mounted in the mobile terminal that the mobile terminal starts to move, a front camera is controlled by the mobile terminal to start so as to detect the face in a viewing angle range of the front camera and, the front camera is closed when the mobile terminal stops to move. The mobile terminal identifies an image collected by the front camera in this process; and when the face is identified, the structured light image sensor is activated for imaging.

Example 3: the unlocking condition may be that a movement track of the mobile terminal in the moving state is a target track for triggering to turn on the screen. In this example, in order to judge whether the mobile terminal is enabled to turn on the screen according to the movement track of the mobile terminal, the target track for triggering to turn on the screen may be pre-stored in the mobile terminal. Generally, when the user holds the mobile terminal with the hand and uses it, a certain included angle is formed between the mobile terminal and the ground and a magnitude of the included angle is typically 30 degrees to 70 degrees. Therefore, in this example, a movement track that the included angle between the mobile terminal in a stopping state and the ground is 30-70°, may be taken as the target track for triggering to turn on the screen, and is stored in the mobile terminal.

For example, the movement track of the mobile terminal is acquired by using the gyroscope. When the user picks up the mobile terminal and the mobile terminal is upflifted, the gyroscope detects an angular movement of the mobile terminal, and forms the movement track of the mobile terminal according to an angular movement condition of the mobile terminal when the mobile terminal stops to move.

Upon detection of the movement track of the mobile terminal, the movement track of the mobile terminal may be analyzed, and the magnitude of an included angle between the mobile terminal in the stopping state and the ground is extracted. The extracted included angle is compared with the included angle of the target track stored in the mobile terminal; and if the extracted included angle is within an included angle range of the target track, it is judged that the movement track of the mobile terminal is the target track for triggering to turn on the screen, and thus the structured light image sensor is controlled by the mobile terminal to start for imaging.

The structured light image sensor is configured to project a structured light to an imaging object of the mobile terminal, where a set of projections of light beams in a known spatial direction is referred as the structured light. In this embodiment, the structured light may be of any one of a raster pattern, a light-spot pattern, a speckle pattern (including a circular pattern and a crossed pattern), a non-uniform speckle pattern and the like.

At 102, a depth map obtained by the imaging of the structured light image sensor is acquired.

When the structured light emitted by the structured light image sensor reaches the face, each facial organ on the face will hinder the structured light and the structured light will be reflected on the face. At this moment, the reflected light of the structured light on the face may be collected via a camera in the mobile terminal, and the depth map of the face may be obtained through the collected reflection light.

At 103, a face depth model is constructed according to the depth map.

Specifically, the depth map of the face may include the face and a background. First of all, the depth map is subject to de-noising processing and smooth processing to obtain an image of an region where the face is located; and then the image of the face is segmented from an image of the background with foreground and background segmentation and other processing.

After the face is extracted from the depth map, data of characteristic points may be extracted from the depth map of the face. According to the extracted data of the characteristic points, the characteristic points are connected to form a network. For example, according to a relationship of spatial distances among each of the points, points on a same plane or points where the distance between each other is within a threshold range are connected to form a triangular network; and then a face depth model may be constructed by splicing these networks.

At 104, a position of pupils is identified from the face depth model.

When the user is ready to start the mobile terminal, eyes of the user often focus on the screen of the mobile terminal. At this moment, the eyes of the user are in an opened state, and thus the eyes are also in the opened state in the face depth model constructed according to the depth map of the face. Therefore, the position of the eyes can be determined from the face depth model, and thus the position of the pupils is identified.

At 105, when the position of the pupils is within a specified region of the eyes, the screen of the mobile terminal 80 is controlled to turn on.

When the eyes of the user are focused on the screen of the mobile terminal, the pupils are located in the middle of the eyes. In this embodiment, it can be determined whether the user watches the screen according to the identified position of the pupils; and when the user watches the screen, the screen of the mobile terminal is controlled to turn on.

As an example, a circular region with a middle point of the eyes as a circle point and a radius of 4 mm may be taken as a specified region. Upon identification of the position of the pupils from the face depth model, it can be further determined whether the position of the pupils is within the specified region. When the identified position of the pupils is within the specified region of the eyes, it is considered that the user is watching the screen, and the mobile terminal is controlled to turn on the screen.

According to the method for turning on a screen provided by this embodiment, when the change in the moving state of the mobile terminal meets the preset unlocking condition, the structured light image sensor is activated for imaging; the depth map obtained by the imaging of the structured light image sensor is acquired; the face depth model is constructed according to the depth map; a position of pupils is identified from the face depth model; and when the position of the pupils is within a specified region of eyes, the screen of the mobile terminal is turned on. By identifying the position of the pupils in the constructed face depth model, when the position of the pupils is within the specified region of the eyes, the screen of mobile terminal is controlled to turn on the screen; and only when the eyes are focused on the screen of the mobile terminal, the screen of the mobile terminal can be controlled to turn on to unlock the mobile terminal, so that the false unlocking condition of the mobile terminal is effectively prevented and thus the user experience is improved.

In order to more clearly describe a specific implementation process for identifying the position of the pupils from the face depth model in the foregoing embodiment, an embodiment of the disclosure provides another method for turning on a screen. FIG. 2 illustrates a flowchart schematic diagram of a method for turning on a screen provided by a second embodiment of the disclosure.

As illustrated in FIG. 2, on the basis of the embodiment shown in FIG. 1, the operation in 105 may include the following operations.

At 201, the eyes are identified from the face depth model according to a shape of the eyes.

The shape of each facial organ on the face is different, and the eyes are often elliptical and are distributed on an upper half portion of the face. In this embodiment, the eyes may be identified from the constructed face depth model according to the shape of the eyes.

At 202, the pupils are identified in the eyes according to shape of the pupils. Each of the pupils is of a circular shape with a regular edge and a small diameter. In a natural light environment, the diameter of a pupil is about 2.5-5 mm.

In this embodiment, after the eyes are identified from the face depth model, the pupils may be further identified from the eyes according to characteristics such as a magnitude, a shape of the pupils.

At 203, a first central position of the pupils is determined and the first central position is taken as the position of the pupils.

In this embodiment, a circle with a smaller diameter in each of the eyes may be determined as one pupil, and the first central position of the pupil is determined and taken as the position where the pupil is located, where the first central position may be any position of the pupil. For example, the first central position is a center of the pupil and the first central position may be indicated by a coordinate.

Further, in a possible implementation manner of this embodiment of the disclosure, as illustrated in FIG. 2, after the operation in 203, the method may further include the following operations.

At 204, a second central position of the specified region in each of the eyes is extracted.

In this embodiment, in the identified eyes, a middle region of any of the eyes may be taken as a specified region. For example, a circular region formed with a center position of any of the eyes as a circle point and a radius of 3 mm may be taken as the specified region, and then a second central position of the specified region is determined. The second central position may be represented by a coordinate.

At 205, a first offset of the first central position relative to second central position is acquired.

Upon determination of the second central position of the specified region and the first central position of any of the pupils, the first central position may be compared with the second central position so as to obtain a first offset of the first central position relative to the second central position. The first offset may be represented by a difference among coordinates of different coordinate axes.

At 206, when the first offset is within a preset first offset range, it is determined that the position of any of the pupils is within the specified region of any of the eyes.

The first offset range may be preset and stored in the mobile terminal. The first offset range may be, for example, −2 mm to +2 mm, where the "−" indicates that the first central position offsets leftward/downward relative to the second central position, and the "+" indicates that the first central position offsets rightward/upward relative to the second central position.

In this embodiment, the acquired first offset is compared with the preset first offset range; and when the first offset is within the preset first offset range, it is determined that positions of the pupils are within the specified regions of the eyes; and thus it can be determined that the user is watching the screen at present, so that the screen of the mobile terminal may be controlled to turn on.

According to the method for turning on a screen provided by this embodiment, when the change in the moving state of the mobile terminal meets the preset unlocking condition, the structured light image sensor is activated for imaging; the depth map obtained by the imaging of the structured light image sensor is acquired; the face depth model is constructed according to the depth map; the eyes are identified in the face depth model according to shapes of the eyes; the pupils are identified in the eyes according to shapes of the pupils; and the first central position of each of the pupils is determined, and the first central position is taken as the position of the pupils; and therefore the pupils can be accurately identified, so that a foundation is laid to accurately execute the operations for turning on a screen. The second central position of the specified region in each of the eyes is extracted; the first offset of each first central position is acquired relative to each second central position; and when the first offset is within the preset first offset range, it is determined that the positions of the pupils are within the specified regions of the eyes. As the result, it can be judged whether the eyes are focused on the screen according to the positions of the pupils, and thus further judged whether the screen of the mobile terminal is controlled to turn on, so that the false unlocking operation can be effectively prevented.

In order to judge whether the user watches the screen at present more accurately, on the basis of the embodiment shown in FIG. 1, an embodiment of the disclosure provides another method for turning on a screen. FIG. 4 illustrates a flowchart schematic diagram of a method for turning on a screen provided by a fourth embodiment of the disclosure. The operation in 103 may include the following operations.

At 1032, multiple face depth models are constructed according to multiple depth maps obtained within a predetermined duration.

Specifically, the structured light image sensor may acquire multiple depth maps within a predetermined duration, and then each depth map is subject to de-noising processing and smooth processing so as to acquire images of regions where the face is located in the multiple depth maps. Thereafter, through foreground and background segmentation and the like, the image of the face is segmented from the image of the background.

After the face is extracted from each depth map, data of characteristic points may be extracted from the depth map of the face. According to the extracted data of the characteristic points, the characteristic points are connected to form a network. For example, according to relationship of spatial distances among each of the points, points on a same plane or points where the distance between each other is within a threshold range are connected to form a triangular network; and then a face depth model may be constructed by splicing these networks. The operation that multiple face depth models are constructed according to multiple depth maps obtained within a predetermined duration may be that a corresponding face depth model is constructed according to an image of a face region on each depth map; and in this way, corresponding face depth models are constructed for all depth maps within the predetermined duration, and thus the accuracy of judging whether the user watches the screen is improved. The operation that multiple face depth models are constructed according to multiple depth maps obtained within a predetermined duration may also be that several depth maps are selected from the multiple depth maps, and a corresponding face depth model is constructed for each of the selected depth map. For example, if nine depth maps are acquired, one depth map is selected every two depth maps to construct one corresponding face depth model, i.e., three depth maps are selected and three corresponding face depth models are constructed. In this way, since a time span for selecting the multiple depth maps nearly occupies the whole predetermined duration, the accuracy of judging whether the user watches the screen may also be guaranteed without constructing a corresponding face depth model for each depth map, and associated calculation amount is reduced.

The operation in 105 may include the following operation.

At 1052, when the positions of the pupils in each of the multiple face depth models are within the specified regions of the eyes, the screen of the mobile terminal is controlled to turn on.

Specifically, after the multiple face depth models are constructed, a position of the pupils in each of the multiple face depth models may be identified. When the position of each identified pupil is within the specified region of the eyes, it may be determined that a duration of the user watching the screen of the mobile terminal exceeds the preset duration. When the duration of the user watching the screen exceeds the preset duration, it is indicated that the user does not watch the screen occasionally. At this time, the screen of the mobile terminal is controlled to turn on. In this way, conditions for controlling to turn on the screen of the mobile terminal can be improved, and thus the probability of false unlocking is further reduced.

In order to further improve the accuracy of face identification, in a possible implementation of this embodiment of the disclosure, a visible light image sensor may be used for imaging to acquire a visible light image so as to determine whether the user has an intention to unlock the mobile terminal according to the visible light image. An embodiment of the disclosure provides another method for turning on a screen. FIG. 3 illustrates a flowchart schematic diagram of a method for turning on a screen according to a third embodiment of the disclosure. As illustrated in FIG. 3, on the basis of the embodiment shown in FIG. 1, before the operation in 104, the method may further include the following operations.

At 301, when the structured light image sensor is activated for imaging, simultaneously a visible light image sensor is activated for imaging;

At 302, a visible light image obtained by the imaging of the visible light image sensor is acquired.

In this embodiment, when it is detected that a movement track of the mobile terminal is a target track for triggering to turn on the screen of the mobile terminal, the structured light image sensor and the visible light image sensor are activated simultaneously for imaging, a depth map of the face is acquired by the imaging of the structured light image sensor and a visible light image is acquired by the imaging of the visible light image sensor.

At 303, face identification is performed on the visible light image, and a position of a face in the visible light image is determined.

After the visible light image is acquired by the imaging of the visible light image sensor, a related face identification technology may be adopted to perform the face identification on the visible light image; and after the face is identified from the visible light image, the position of the face is further determined in the visible light image.

At 304, when the face is within a specified region of the visible light image, a face depth model is constructed.

Specifically, a third central position of the face may be determined and a fourth central position of the specified region of the visible light image is extracted, so that a second offset of the third central position relative to the fourth central position is acquired. When the second offset is within a preset second offset range, it is determined that the face is within the specified region of the visible light image. The second offset range may be predetermined and stored in the mobile terminal.

Generally, when the mobile terminal is used by the user, the face of the user directly faces towards the screen of the mobile terminal. At this time, the face in the photographed face image is always around a middle position of the image. In this embodiment, an region around the middle position of the visible light image may be taken as the specified region. For example, a middle region which starts from ¼ of the top of the visible light image and ends from ¼ of the bottom of the visible light image, may be taken as the specified region, and the area of the specified region may be a half of that of the visible light image.

In this embodiment, upon determination of the position of the face in the visible light image, the third central position of the face may further be determined, and the fourth central position of the specified region of the visible light image is extracted. The third central position may be represented by a coordinate of the position of the face in the visible light image, and the fourth central position may be represented by a coordinate of the specified region in the visible light image. The third central position is compared with the fourth central position, and the second offset of the third central position relative to the fourth central position is acquired; and when the second central position is within the second offset range, it is determined that the face is within the specified region of the visible light image and a face depth model is constructed.

According to the method for turning on a screen in this embodiment, before the face depth model is constructed according to the depth map, the visible light image sensor is activated for imaging to acquire the visible light image; the face identification is performed on the visible light image and the position of the face is determined in visible light image; and when the face is within the specified region of the visible light image, a face depth model is constructed. In this way, the energy consumption caused by construction of the face depth model in a case that it is unnecessary to control the screen of the mobile terminal to turn on can be prevented, so that the energy consumption of the mobile terminal is reduced, and thus the endurance capability of a battery is improved.

In a possible implementation of this embodiment of the disclosure, before the structured light image sensor is activated for imaging, an infrared sensor may further be activated for imaging so as to acquire an infrared image obtained by the imaging of the infrared sensor, and a face profile is extracted from the infrared image. The extracted face profile is compared with a pre-stored face profile of an owner of the mobile terminal; when the face profile is matched with the pre-stored face profile, it is determined that a present imaging object is the owner of the mobile terminal; and when the imaging object is the owner of the mobile terminal, the structured light sensor is activated for imaging. The imaging object is judged by performing the face identification on the infrared image, and when the imaging object is the owner of the mobile terminal, the structured light image sensor is activated for imaging, so that the operation space and power consumption of the mobile terminal can be saved. By means of performing the face identification and living body detection through combination of the infrared sensor, the visible light image sensor and the structured light image sensor, the identification rate can further be improved.

Figure 5:
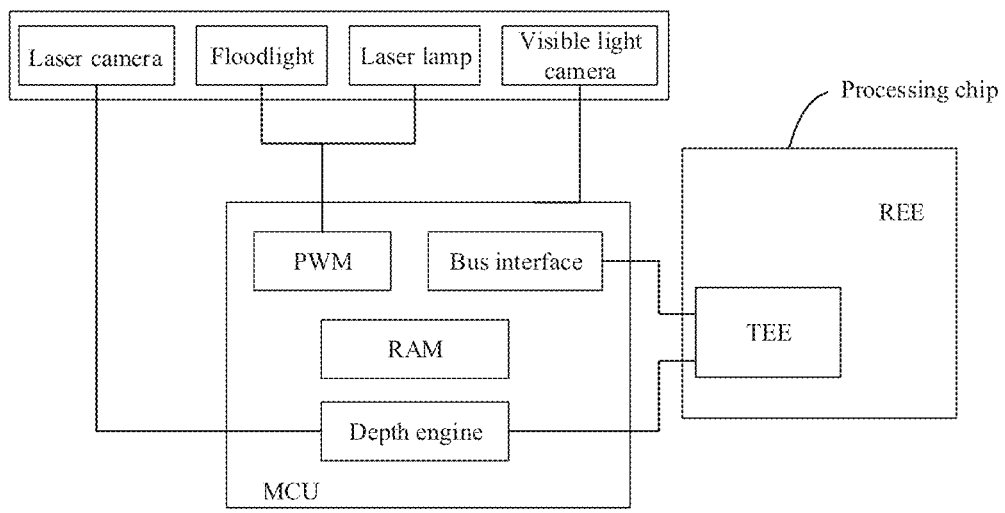
FIG. 5 illustrates a structural schematic diagram of a mobile terminal according to an embodiment of the disclosure.

The method for turning on a screen in the foregoing embodiment may be executed by a trusted application, where the trusted application runs in a trusted execution environment (TEE). A dedicated hardware of the TEE is configured to communicate with the trusted application. As a possible structural form, the mobile terminal may be provided with a laser camera, a laser lamp, a Microcontroller Unit (MCU) and the like. Specifically, referring to FIG. 5, FIG. 5 illustrates a structural schematic diagram of a mobile terminal according to an embodiment of the disclosure. As illustrated in FIG. 5, the mobile terminal may include: a laser camera, a floodlight, a visible light camera, a laser lamp, an MCU and a processing chip. The dedicated hardware of the TEE may be, for example, the MCU. By executing the method for turning on a screen in the embodiments of the disclosure through the trusted application run in the TEE, the security of the mobile terminal can be guaranteed.

In this embodiment, the MCU may include a Pulse Width Modulation (PWM), a depth engine, a bus interface and a Random Access Memory (RAM). The processing chip operates with a Rich Execution Environment (REE) and the TEE. The REE and the TEE are separated from each other.

In the mobile terminal shown in FIG. 5, the PWM is configured to modulate the floodlight to emit infrared light and/or modulate the laser lamp to emit structured light, and project the emitted infrared light and/or structured light onto an imaging object. The laser camera is configured to collect a structured light image and send the collected structured light image to the depth engine. The depth engine is configured to calculate according to the structured light image so as to acquire depth data of view corresponding to the imaging object, and send the depth data of view to the trusted application via the bus interface. The bus interface includes: a Mobile Industry Processor Interface (MIPI), an Inter-Integrated Circuit (I2C) synchronous serial bus interface, and a Serial Peripheral Interface (SPI). The bus interface performs information interaction with the trusted application running in the TEE. The trusted application (not shown in FIG. 5) runs in the TEE and is configured to perform operations such as turning on a screen according to the depth data of view.

In order to implement the above embodiments, the disclosure further provides an apparatus for turning on a screen.

FIG. 6 illustrates a structural schematic diagram of an apparatus for turning on a screen according to a first embodiment of the disclosure.

As illustrated in FIG. 6, the apparatus 50 for turning on a screen may include: a first control module 510, an acquisition module 520, a construction module 530, an identification module 540 and a second control module 550.

The first control module 510 is configured to activate, when a change in a moving state of a mobile terminal meets a preset unlocking condition, a structured light image sensor for imaging.

The acquisition module 520 is configured to acquire a depth map obtained by the imaging of the structured light image sensor.

The construction module 530 is configured to construct a face depth model according to the depth map.

The identification module 540 is configured to identify a position of pupils from the face depth model.

The second control module 550 is configured to control, when the position of the pupils is within a specified region of eyes, the screen of the mobile terminal to turn on.

Figure 7:
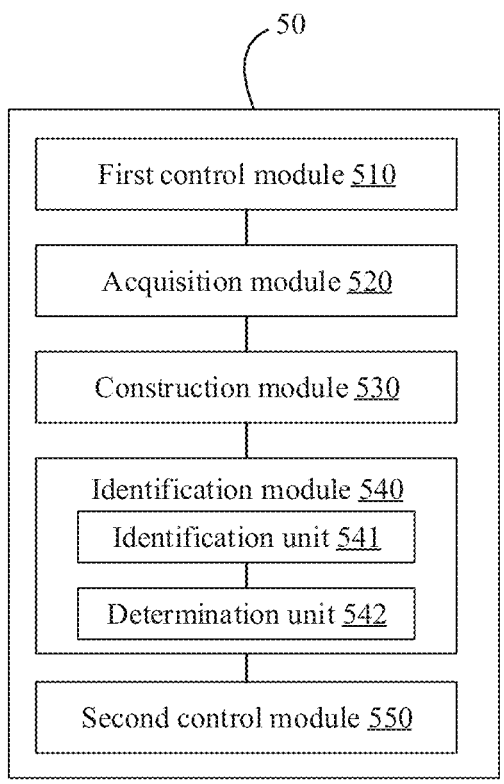
FIG. 7 illustrates a structural schematic diagram of an apparatus for turning on a screen according to a second embodiment of the disclosure.

Furthermore, in a possible implementation of this embodiment of the disclosure, as illustrated in FIG. 7, on the basis of the embodiment shown in FIG. 6, the identification module 540 may include an identification unit 541 and a determination module 542.

The identification unit 541 is configured to identify the eyes in the face depth model according to a shape of the eyes, and identify the pupils in the identified eyes according to a shape of the pupils.

The determination module 542 is configured to determine a first central position of each of the pupils and take the first central position as the position of the pupils.

Furthermore, in a possible implementation of this embodiment of the disclosure, the determination module 542 is further configured to: after taking the first central position as the position of the pupils, extract a second central position of the specified region in each of the identified eyes; acquire a first offset of the first central position relative to each second central position; and determine, when the first offset are within a preset first offset range, that the position of the pupils is within the specified region of the eyes.

The eyes are identified in the face depth model according to the shape of the eyes; the pupils are identified in the identified eyes according to the shape of the pupils; and the first central position of pupils is determined, and the first central position is taken as the position of the pupils; and therefore the pupils can be accurately identified, so that a foundation is laid to accurately execute operations for turning on a screen. The second central position of the specified region in each of the eyes is extracted, the first offset of each first central position is acquired relative to each second central position, and when the first offset is within the preset first offset range, it is determined that the position of the pupils is within the specified region of the eyes. As a result, it can be judged whether the eyes are focused on the screen according to the position of the pupils, and thus further judged whether the screen of the mobile terminal is controlled to turn on, so that the false unlocking operation can be effectively prevented.

Furthermore, in the fourth embodiment of the disclosure, as illustrated in FIG. 6, the construction module 530 is further configured to construct multiple face depth models according to multiple depth maps obtained within a predetermined duration. The second control module 550 is further configured to control, when positions of the pupils identified from each of the multiple face depth models are within the specified region of the eyes, the screen of the mobile terminal to turn on.

Figure 8:
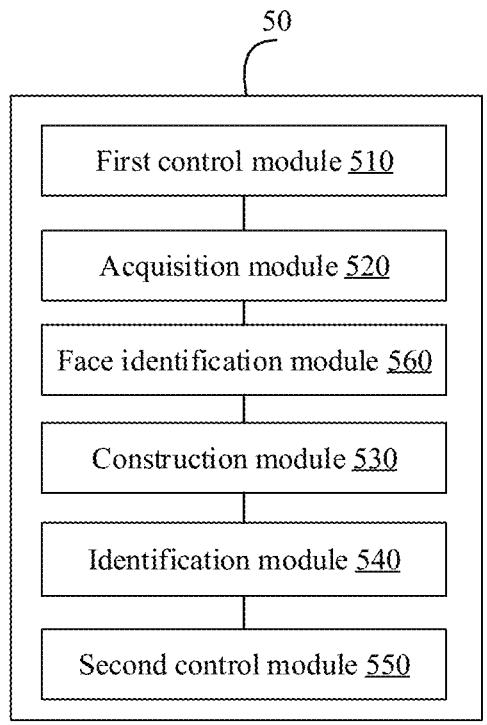
FIG. 8 illustrates a structural schematic diagram of an apparatus for turning on a screen according to a third embodiment of the disclosure.

Furthermore, in a possible implementation of this embodiment of the disclosure, as illustrated in FIG. 8, on the basis of the embodiment shown in FIG. 6, the apparatus 50 for turning on a screen may further include a face identification module 560.

The face identification module 560 is configured to simultaneously activate, when the structured light image sensor is activated for imaging, a visible light image sensor for imaging; acquire a visible light image obtained by the imaging of the visible light image sensor; perform face identification on the visible light image, and determine a position of a face in the visible light image; and construct a face depth model when the face is within a specified region of the visible light image.

Specifically, the face identification module 560 is further configured to determine a third central position of the face; extract a fourth central position of the specified region of the visible light image; acquire a second offset of the third central position relative to the fourth central position; and determine, when the second offset is within a preset second offset range, that the face is within the specified region of the visible light image, thereby triggering the construction module 530 to construct the face depth model according to the depth map.

Before the face depth model is constructed according to the depth map, firstly the visible light image sensor activated for imaging and acquire the visible light image; the face identification is performed on the visible light image and the position of the face is determined in visible light image; and when the face is within the specified region of the visible light image, a face depth model is constructed. Therefore, energy consumption caused by construction of the face depth model in a case that it is unnecessary to control the screen of the mobile terminal to turn on can be prevented, so that the energy consumption of the mobile terminal is reduced, and thus the endurance capability of a battery is improved.

In a possible implementation of this embodiment of the disclosure, the apparatus 50 for turning on a screen may further be configured to: before the first control module 510 activates the structured light image sensor for imaging, control an infrared sensor first for imaging and acquire an infrared image obtained by the imaging of the infrared sensor; extract a face profile from the infrared image; and determine, when the face profile is matched with a pre-stored face profile, that a present imaging object is an owner of the mobile terminal. Thereafter, the first control module 510 activates the structured light image sensor for imaging.

The imaging object is judged by performing the face identification on the infrared image, and when the imaging object is the owner of the mobile terminal, the structured light image sensor is activated for imaging, so that the operation space and power consumption of the mobile terminal can be saved. By means of performing the face identification and living body detection through combination of the infrared sensor, the visible light image sensor and the structured light image sensor, the identification rate can further be improved.

It is to be noted that descriptions on the embodiments of the method for turning on a screen is also applied to the apparatus for turning on a screen in this embodiment, and the implementation principles thereof are similar and will not be elaborated herein.

According to the apparatus for turning on a screen of this embodiment, when the change in a moving state of the mobile terminal meets the preset unlocking condition, the structured light image sensor is activated for imaging; the depth map obtained by the imaging of the structured light image sensor is acquired; the face depth model is constructed according to the depth map; a position of the pupils is identified from the face depth model; and when the position of the pupils is within a specified region of eyes, the screen of the mobile terminal is controlled to turn on. By identifying the position of the pupils in the constructed face depth model, when the position of the pupils is within the specified region of the eyes, the screen of the mobile terminal is controlled to turn on; enabling only when the eyes are focused on the screen of the mobile terminal, the screen of the mobile terminal can be controlled to turn on to unlock the mobile terminal, so that a false unlocking of the mobile terminal is effectively prevented and thus the user experience is improved.

In order to implement the above embodiments, the disclosure further provides a mobile terminal.

FIG. 9 illustrates a structural schematic diagram of a mobile terminal according to an embodiment of the disclosure.

As illustrated in FIG. 9, the mobile terminal 80 may include: an imaging sensor 810, a memory 820, an MCU 830, a processor 840, and a trusted application 850 stored on the memory 820 and capable of running under a TEE of the processor 840. The MCU 830 is a dedicated hardware of the TEE and connected with the imaging sensor 810 and the processor 840, and the MCU communicates with the MCU 830 and the processor 840 in an encryption manner, which guarantees the security of data communication. The MCU 830 is configured to activate the imaging sensor 810 for imaging and send imaging data to the processor 840.

The imaging sensor 810 may include: a laser camera, a floodlight, a visible light camera and a laser lamp. The MCU 830 may include: a PWM, a depth engine, a bus interface and an RAM. The PWM is configured to modulate the floodlight to emit infrared light and/or modulate the laser lamp to emit structured light, and project the emitted infrared light and/or structured light onto an imaging object. The laser camera is configured to collect a structured light image and send the collected structured light image to the depth engine. The depth engine is configured to calculate according to the structured light image so as to acquire depth data of view corresponding to the imaging object, and send the depth data of view to the processor 840 via the bus interface.

The processor 840 implements a trusted application 850 to implement the method for turning on a screen in the foregoing embodiments.

According to the mobile terminal 80 in this embodiment, by providing the imaging sensor 810, the memory 820, the MCU 830, the processor 840, and the trusted application 850 stored on the memory 820 and capable of running under the TEE of the processor 840, the MCU 830 configure to control the imaging sensor 810 for imaging and to send imaging data to the processor 840, and the processor 840 executes the trusted application 850 to implement the method for turning on a screen as mentioned in the embodiment of the first aspect, so that the screen of the mobile terminal 80 is enabled to turn. By identifying the position of the pupils in the constructed face depth model, when the position of the pupils is within the specified region of the eyes, the screen of the mobile terminal 80 is controlled to turn on, enabling that only when the eyes are focused on the screen of the mobile terminal 80, the screen of the mobile terminal 80 can be controlled to turn on to unlock the mobile terminal, so that a false unlocking of the mobile terminal is effectively prevented and thereby the user experience is improved.

In order to implement the above embodiments, the disclosure further discloses a computer readable storage medium having a computer program stored thereon; and the computer program, when being executed by a processor, implements the method for turning on a screen in the foregoing embodiments.

Although certain embodiments of the disclosure have been shown and described, it will be appreciated that the above embodiments are exemplary and cannot be construed to limit the disclosure. Those of ordinary skill in the art may make changes, modifications, substitutions and variations on the above embodiments departing from the scope of the disclosure, which is defined by appended claims and their equivalents.

What is claimed is:

1. A method for turning on a screen, comprising:
activating, when a change in a moving state of a mobile terminal meets a preset unlocking condition, a structured light image sensor for imaging;
acquiring a depth map obtained by the imaging of the structured light image sensor;
simultaneously activating, when the structured light image sensor is activated for imaging, a visible light image sensor for imaging;
acquiring a visible light image obtained by the imaging of the visible light image sensor;
performing face identification on the visible light image and determining a position of a face in the visible light image;
constructing a face depth model according to the depth map when the face is within a specified region of the visible light image;
identifying a position of pupils from the face depth model; and
controlling, when the position of the pupils is within a specified region of eyes, the screen of the mobile terminal to turn on,
wherein the operation of constructing the face depth model when the face is within a specified region of the visible light image comprises:
determining a first central position of the face;
extracting a second central position in the specified region of the visible light image;
acquiring a second offset of the first central position relative to the second central position; and
determining, when the second offset is within a preset second offset range, that the face is within the specified region of the visible light image.

2. The method for turning on a screen of claim 1, wherein the operation of constructing a face depth model according to the depth map comprises:
constructing multiple face depth models according to multiple depth maps obtained within a predetermined duration; and
the operation of controlling the screen of the mobile terminal to turn on when the position of the pupils is within a specified region of eyes comprises:
when positions of the pupils in each of the multiple face depth models are within the specified region of the eyes, controlling the screen of the mobile terminal to turn on.

3. The method for turning on a screen of claim 1, wherein the operation of identifying a position of pupils from the face depth model comprises:
identifying the eyes in the face depth model according to a shape of the eyes;
identifying the pupils in the identified eyes according to a shape of the pupils; and
determining a first central position of the pupils and taking first central position as the position of the pupils.

4. The method for turning on a screen of claim 3, wherein after taking the first central position as the position of the pupils, the method further comprises:
extracting a second central position of the specified region of the eyes;
acquiring a first offset of the first central position relative to the second central position; and
when the first offset is within a preset first offset range, determining that the position of the pupils is within the specified region of the eyes.

5. The method for turning on a screen of claim 1, wherein before the operation of activating a structured light image sensor for imaging, the method further comprises:
activating an infrared sensor for imaging;
acquiring an infrared image obtained by the imaging of the infrared sensor;
extracting a face profile from the infrared image; and
determining, when the face profile is matched with a pre-stored face profile, that a present imaging object is an owner of the mobile terminal.

6. The method for turning on a screen of claim 1, wherein the method for turning on the screen is executed by a trusted application running in a Trusted Execution Environment (TEE).

7. The method for turning on a screen of claim 6, wherein a dedicated hardware of the TEE communicates with the trusted application.

8. A mobile terminal, comprising: an imaging sensor, a memory, a Microcontroller Unit (MCU), a processor, and a trusted application stored on the memory and capable of running under a Trusted Execution Environment (TEE) of the processor, wherein
the MCU is a dedicated hardware of the TEE and connected with the imaging sensor and the processor, and the MCU is configured to activate the imaging sensor for imaging and send imaging data to the processor; and
wherein the processor executes the trusted application to implement the following operations for turning on a screen:
activating, when a change in a moving state of a mobile terminal meets a preset unlocking condition, a structured light image sensor for imaging;
acquiring a depth map of obtained by the imaging of the structured light image sensor;
simultaneously activating, when the structured light image sensor is activated for imaging, a visible light image sensor for imaging;
acquiring a visible light image obtained by the imaging of the visible light image sensor;
performing face identification on the visible light image and determining a position of a face in the visible light image;
constructing a face depth model according to the depth map when the face is within a specified region of the visible light image;
identifying a position of pupils from the face depth model; and
controlling, when the position of the pupils is within a specified region of eyes, the screen of the mobile terminal to turn on,
wherein the processor executes the trusted application to implement the following operations:
determining a first central position of the face;
extracting a second central position in the specified region of the visible light image;

acquiring a second offset of the first central position relative to the second central position; and determining, when the second offset is within a second set offset range, that the face is within the specified region of the visible light image.

9. The mobile terminal of claim 8, wherein the processor executes the trusted application to implement the following operations:

constructing multiple face depth models according to multiple depth maps obtained within a predetermined duration; and when positions of the pupils in each of the multiple face depth models are within the specified region of the eyes, controlling the screen of the mobile terminal to turn on.

10. The mobile terminal of claim 8, wherein the processor executes the trusted application to implement the following operations:

identifying the eyes from the face depth model according to a shape of the eyes;

identifying the pupils in the eyes according to a shape of the pupils; and determining a first central position of the pupils and taking the first central position as the position of the pupils.

11. The mobile terminal of claim 10, wherein the processor executes the trusted application to implement the following operations:

extracting a second central position of the specified region of the eyes;

acquiring a first offset of the first central position relative to the second central position; and determining, when the first offset is within a preset first offset range, that the position of the pupils is within the specified region of the eyes.

12. The mobile terminal of claim 8, wherein the processor executes the trusted application to implement the following operations:

activating an infrared sensor for imaging;

acquiring an infrared image obtained by the imaging of the infrared sensor;

extracting a face profile from the infrared image; and determining, when the face profile is matched with a pre-stored face profile, that a present imaging object is an owner of the mobile terminal.

13. The mobile terminal of claim 8, wherein the trusted application runs in the TEE.

14. The mobile terminal of claim 13, wherein a dedicated hardware of the TEE communicates with the trusted application.

15. The mobile terminal of claim 8, wherein the MCU is communicated with the processor in an encryption manner.

16. A non-transitory computer readable storage medium, having a computer program stored thereon, wherein the computer program, when being executed by a processor, implements the operations of:

activating, when a change in a moving state of a mobile terminal meets a preset unlocking condition, a structured light image sensor for imaging;

acquiring a depth map obtained by the imaging of the structured light image sensor;

simultaneously activating, when the structured light image sensor is activated for imaging, a visible light image sensor for imaging;

acquiring a visible light image obtained by the imaging of the visible light image sensor;

performing face identification on the visible light image and determining a position of a face in the visible light image;

constructing a face depth model according to the depth map when the face is within a specified region of the visible light image;

identifying a position of pupils from the face depth model; and controlling, when the position of the pupils is within a specified region of eyes, the screen of the mobile terminal to turn on, wherein the operation of constructing the face depth model when the face is within a specified region of the visible light image comprises:

determining a first central position of the face;

extracting a second central position in the specified region of the visible light image;

acquiring a second offset of the first central position relative to the second central position; and determining, when the second offset is within a preset second offset range, that the face is within the specified region of the visible light image.

* * * * *